(12) United States Patent
Choi

(10) Patent No.: US 9,701,183 B2
(45) Date of Patent: *Jul. 11, 2017

(54) VEHICLE SLIDING DOOR LOCKING DEVICE

(71) Applicant: Hyundai Motor Company, Seoul (KR)

(72) Inventor: Jaehong Choi, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,992

(22) Filed: Nov. 13, 2014

(65) Prior Publication Data

US 2015/0291014 A1    Oct. 15, 2015

(30) Foreign Application Priority Data

Apr. 9, 2014   (KR) .......................... 10-2014-0042598

(51) Int. Cl.
  *B60J 5/06*    (2006.01)
  *E05D 15/10*   (2006.01)

(52) U.S. Cl.
  CPC .............. *B60J 5/06* (2013.01); *E05D 15/101* (2013.01); *E05D 2015/1026* (2013.01); *E05Y 2900/531* (2013.01)

(58) Field of Classification Search
  CPC .... B60J 5/047; B60J 5/06; B60J 5/062; E05D 15/101; E05D 2015/1026
  See application file for complete search history.

(56) References Cited

U.S. PATENT DOCUMENTS

| 4,110,934 A * | 9/1978 | Zens ..................... E05D 15/101 296/155 |
| 4,502,246 A * | 3/1985 | Minami .................. E05C 17/50 49/213 |
| 5,896,704 A * | 4/1999 | Neag ................... E05D 15/1081 296/155 |
| 5,921,613 A * | 7/1999 | Breunig ..................... B60J 5/06 296/146.12 |
| 7,654,608 B2 * | 2/2010 | Krajenke ............. E05D 15/101 296/155 |
| 2006/0175867 A1 * | 8/2006 | Heuel ..................... E05D 3/127 296/155 |
| 2008/0100091 A1 * | 5/2008 | Kunishima ................ B60J 5/06 296/146.1 |

(Continued)

FOREIGN PATENT DOCUMENTS

| FR | 2 881 998 | * 8/2006 |
| FR | 2893543 | * 5/2007 |

(Continued)

*Primary Examiner* — Gregory Strimbu
(74) *Attorney, Agent, or Firm* — Morgan Lewis & Bockius LLP

(57) ABSTRACT

A sliding door locking device of a vehicle may include a rail mounted to a vehicle body along a length direction thereof, a slider inserted in and slidably coupled to the rail, a connection structure of which one end is relatively rotatably coupled to the slider and another end is coupled to a door of the vehicle to slidably support the door of the vehicle, a latch rotatably mounted to the slider to lock the connection structure to the rail or release the connection structure from the rail, and a locking groove formed in the rail and to which the latch is detachable therefrom.

5 Claims, 15 Drawing Sheets

(56) References Cited

U.S. PATENT DOCUMENTS

2015/0183303 A1* 7/2015 Choi .................. B60J 5/047
                                                              49/405
2015/0183304 A1* 7/2015 Choi .................. B60J 5/06
                                                              49/405

FOREIGN PATENT DOCUMENTS

| | | |
|---|---|---|
| JP | 2003-97144 A | 4/2003 |
| KR | 10-2008-0007947 | 1/2008 |
| KR | 10-1382759 B1 | 4/2014 |
| WO | WO 2006/005572 A1 * | 1/2006 |

* cited by examiner

VEHICLE SLIDING DOOR LOCKING DEVICE

CROSS-REFERENCE TO RELATED APPLICATION

The present application claims priority to Korean Patent Application No. 10-2014-0042598 filed Apr. 9, 2014, the entire contents of which is incorporated herein for all purposes by this reference.

BACKGROUND OF THE INVENTION

Field of the Invention

The present invention relates to a sliding door locking device of a vehicle. More particularly, the present invention relates to a vehicle sliding door locking device that can lock or release a sliding door that opens or closes a door opening portion of the vehicle body by being moved frontward or rearward along a length direction of the vehicle.

Description of Related Art

In general, a vehicle has a predetermined sized cabin formed therein for boarding of a driver and accompanying occupants therein, and cabin opening/closing doors mounted to the vehicle body for opening/closing the cabin.

In a case of a passenger vehicle, the cabin opening/closing doors are front doors mounted to a front side of the vehicle in the length direction of the vehicle, and rear doors mounted to a rear side of the vehicle in the length direction of the vehicle, wherein, in general, the front doors and the rear doors are rotatably mounted to the vehicle body with hinges.

In a case of a van in which many people may board, the cabin opening/closing door opens/closes the cabin as the cabin opening/closing door slides forward/backward in the length direction of the vehicle.

Since the sliding door in the van opens the cabin as the opening/closing door moves backward in the length direction of the vehicle, and closes the cabin as the opening/closing door moves forward in the length direction of the vehicle, the sliding type of cabin opening/closing door in the van has a smaller space requirement for opening/closing the door than the hinge type of cabin opening/closing door in the passenger vehicle, to have an advantage of opening the door opening formed in the vehicle body completely even in a opening/closing space with a small width.

In a sliding door device of a vehicle provided with such a conventional sliding door, a sliding door locking device that can stably lock the sliding door to a vehicle body and smoothly release the sliding door so that the sliding door can smoothly perform sliding movement is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding door locking device of a vehicle that can stably lock a sliding door of the vehicle to the vehicle body, continuously maintain the locked state, and automatically release the locked state of the sliding door when the sliding door is opened for smooth movement of the sliding door.

According to various aspects of the present invention, a sliding door locking device of a vehicle may include a rail mounted to a vehicle body along a length direction thereof, a slider inserted in and slidably coupled to the rail, a connection structure of which one end is relatively rotatably coupled to the slider and another end is coupled to a door of the vehicle to slidably support the door of the vehicle, a latch rotatably mounted to the slider to lock the connection structure to the rail or release the connection structure from the rail; and a locking groove formed in the rail and to which the latch is detachable therefrom.

The rail may include a middle rail provided in a height directional center of the rail, a first upper end rail provided at a position higher than the middle rail, a second upper end rail provided at a position higher than the first upper end rail, and a lower end rail provided at a position lower than the middle rail in which the locking groove may be formed concavely in a predetermined portion along a length direction of the first upper end rail.

The connection structure may include a swing arm rotatably engaged to the slider, and the latch may be released from the locking groove according to rotation of the swing arm.

The swing arm may include a swing arm body formed in a shape of a square bar, an operation protrusion integrally protruding from one end of the swing arm body while forming a predetermined angle with respect to the swing arm body, a second upper end rail roller mounted to a front end of the operation protrusion and rolling by being inserted in a second upper end rail when the door is opened, and a return spring providing an elastic restoring force to the swing arm.

An operation surface that rotates the latch by pressing the latch may be formed in the operation protrusion.

The latch may include a latch body rotatably engaged to the slider, a hook formed at one end of the latch body and detachably hooked to the locking groove, and a pressure protrusion protruding in a perpendicular direction with respect to the latch body at a portion opposite to the hook on the latch body and pressed by the operation surface of the operation protrusion of the swing arm according to rotation movement of the swing arm.

According to the sliding door locking device of a vehicle of various embodiments of the present invention, a latch is rotatably mounted to a slider that sliding-movably supports a lower portion of a sliding door of the vehicle and a locking groove to which the latch is detachably mounted is formed in a rail to which the slider is coupled in a rollably movable manner such that, when the latch is hooked in the locking groove, the sliding door can be stably locked to the vehicle body and the locked state can be continuously maintained.

In addition, when the sliding door is pivoted to be opened, a swing arm of the connection structure that supports the sliding door rotates and presses the latch to release the latch from the locking groove so that the locking state of the sliding door is automatically released and the sliding door can be smoothly moved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A vehicle sliding door locking device according to various embodiments of the present invention may be applied to a front sliding door or a rear sliding door that opens or closes a door opening by being slidably moved along a length direction of the vehicle.

Figure 1:
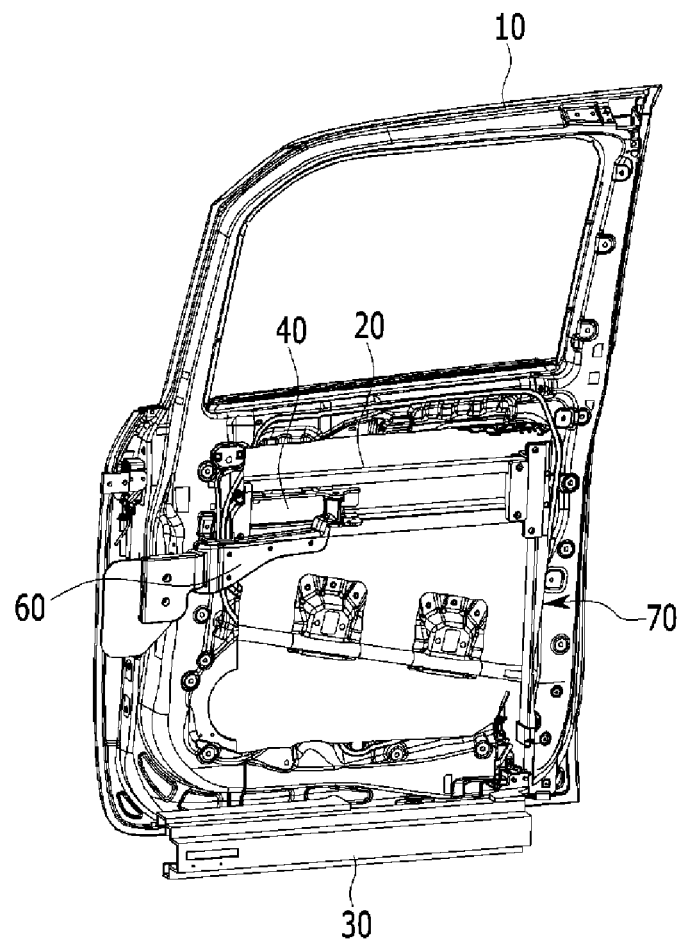
FIG. 1 is a front view of an exemplary front sliding door locking device of a vehicle according to the present invention.

Referring to FIG. 1, a front sliding door device of a vehicle according various embodiments of the present invention may include an upper rail 20 extended along a width direction of a front door panel 10 that forms a front door of a vehicle and mounted to an upper portion of the front door panel 10, a lower rail 30 mounted to be extended along a length direction of a vehicle body, an upper slider 40 fitted to the upper rail 20 and supporting the upper rail 20, a lower slider 50 slidably fitted to the lower rail 30 and mounted thereto, an upper support structure 60 of which one end is connected to the upper slider 40 and the other end is mounted to the vehicle body to support the upper slider 40, and a connection structure 70 connecting the lower slider 50 and the upper rail 20.

Figure 2:
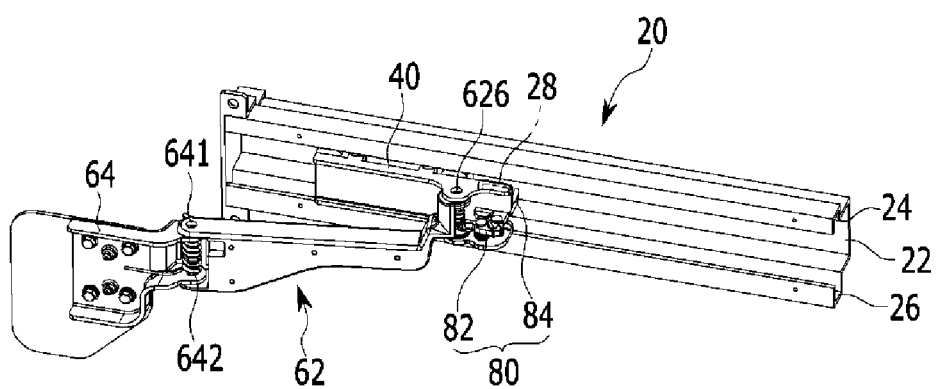
FIG. 2 is a perspective view of an upper rail and an upper support structure coupled together in the exemplary front sliding door locking device of a vehicle according to the present invention.

Referring to FIG. 2, the upper rail 20 may include a middle rail 22 provided at the center in a height direction thereof, an upper end rail 24 provided higher than the middle rail 22, and a lower end rail 26 provided lower than the middle rail 22.

Figure 3:
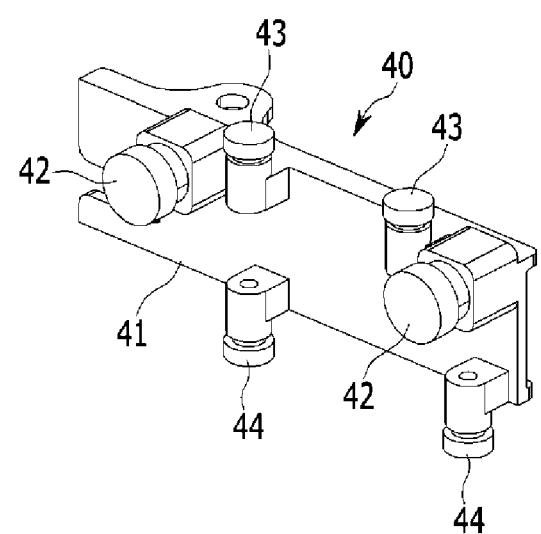
FIG. 3 is a perspective view of an upper slider in the exemplary front sliding door locking device of the vehicle according to the present invention.
Figure 4:
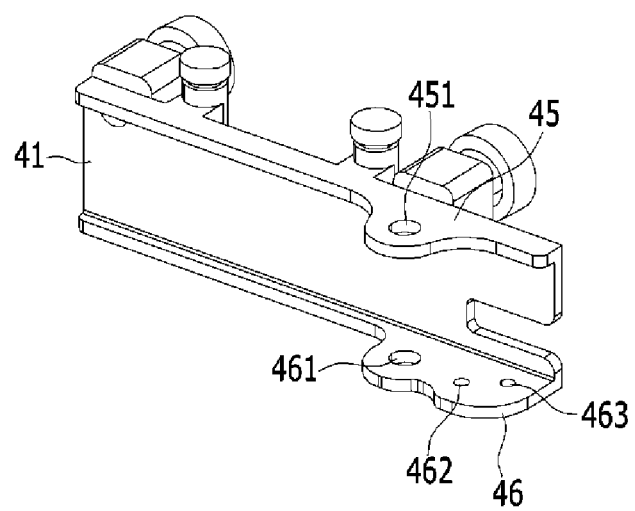
FIG. 4 is another perspective view of the upper slider according to the present invention.

Referring to FIG. 3 and FIG. 4, the upper slider 40 may include an upper slider body 41 substantially having a rectangular planar shape.

Two middle rail rollers 42 inserted to the middle rail 22 and rolling along the upper rail 20 may be rotatably mounted to a front surface of the upper slider body 41. Here, the two middle rail rollers 42 are distanced from each other along a width direction of the upper slider body 41.

Two upper rail rollers 43 inserted in the upper end rail 24 and rolling along the upper rail 20 may be mounted to a front surface of the upper slider body 41. Here, the two upper rail rollers 43 are vertically rotatable while being oriented upward and distanced from each other along the width direction of the upper slider body 41.

Two lower rail rollers 44 inserted in the lower end rail 26 and rolling along the upper rail 20 are disposed in the front surface of the upper slider body 41 with a distance therebetween along a width direction thereof, and are vertically rotatable while being oriented downward.

An upper flange 45 and a lower flange 46 that are perpendicularly protruded are formed at width directional lateral ends of the upper slider body 41, a first assembly hole 451 penetrating the upper flange 45 is formed in the upper flange 45, and a first assembly hole 461, a second assembly hole 462, and a third assembly hole 463 that penetrate the lower flange 46 are formed in parallel with each other in the lower flange 46.

Figure 5:
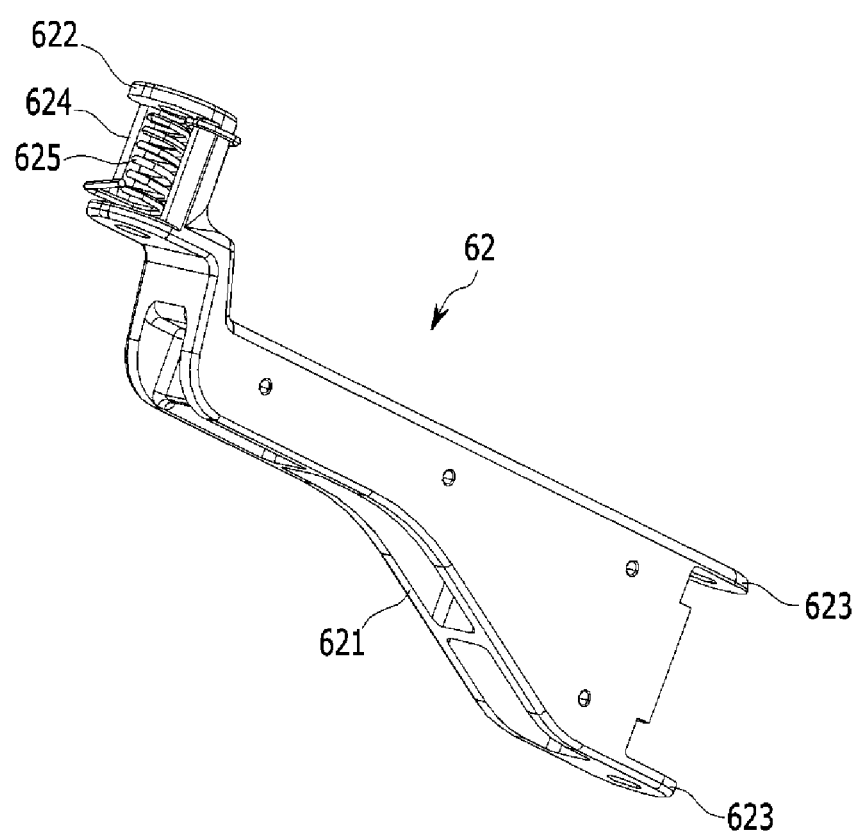
FIG. 5 is a perspective view of a swing arm in the exemplary front sliding door locking device of the vehicle according to the present invention.

Referring to FIG. 5, the upper support structure 60 includes a swing arm 62 of which one end is inserted in the upper flange 45 and the lower flange 46 of the upper slider body 41 and is thus rotatably engaged thereto.

The swing arm 62 includes a swing arm body 621, a first flange 622 integrally protruding by being extended from one front end of the swing arm body 621 and formed in the shape of a cylinder, and two second flanges 623 disposed at the left and right sides along the width direction at the other front end of the swing arm body 622 and integrally protruding by being extended therefrom.

A part of the first flange 622 is cut off, and one edge of the cut-off portion forms a pressure edge 624 that rotates a latch by pressing the same.

A return spring 625 is installed in the cylindrical-shaped first flange 622, and the return spring 625 returns the swing arm 62 to its original position after the swing arm 62 performs a swing movement.

Referring to FIG. 2, the first flange 622 of the swing arm 62 is inserted between the upper flange 45 and the lower flange 46 of the upper slider body 41 and then rotatably engaged with a penetrating assembly pin 626.

The second flange 623 of the swing arm body 621 is supported by being engaged to a mounting bracket 64, and the mounting bracket 64 may be mounted to the vehicle.

One end of the mounting bracket 64 is inserted between the two second flanges 623 of the swing arm body 621 and is then engaged with a penetrating assembly pin 641.

Thus, the swing arm 62 performs a switching movement with respect to the mounting bracket 64.

In order to return the swing arm 62 to its original position after the swing movement with respect to the mounting bracket 64, a return spring 642 is wound to an external circumference of the assembly pin 641.

Figure 6:
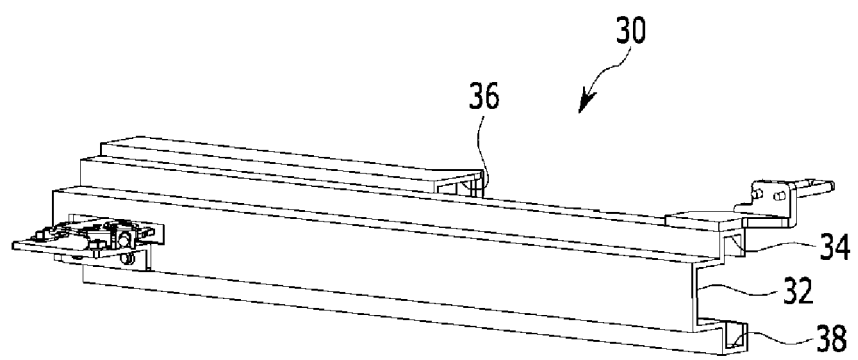
FIG. 6 is a perspective view of a lower rail in the exemplary front sliding door locking device of the vehicle according to the present invention.

Referring to FIG. 6, the lower rail 30 includes a middle rail 32 provided in a height directional center of the lower rail 30, a first upper end rail 34 provided higher than the middle rail 32, a second upper end rail 36 provided higher than the first upper end rail 34, and a lower end rail 38 provided lower than the middle rail 32.

Figure 7:
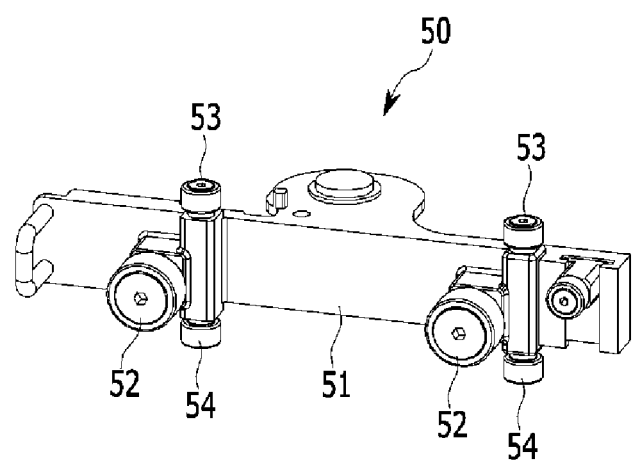
FIG. 7 is a perspective view of a lower slider in the exemplary front sliding door locking device of the vehicle according to the present invention.
Figure 8:
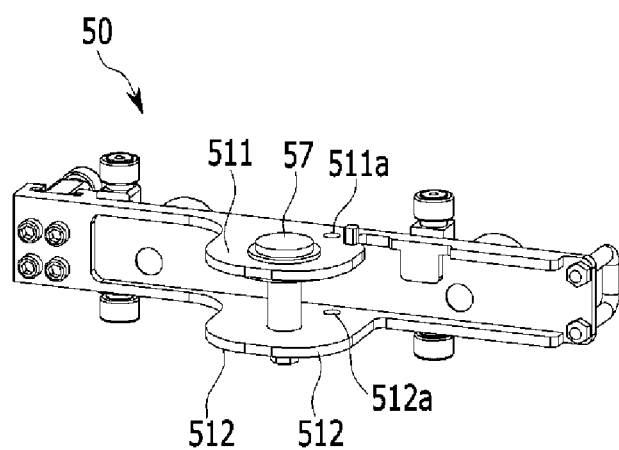
FIG. 8 is another perspective view of a lower slider of FIG. 7, but from a different angle.

Referring to FIG. 7 and FIG. 8, the lower slider 50 includes a lower slider body 51 substantially having a square plate shape, two middle rail rollers 52 rotatably disposed in the front side of the lower slider body 51 at a distance from each other along a length direction thereof and rolling by being inserted in the middle rail 32 of the lower rail 30, two upper end rail rollers 53 rotatably disposed in the front surface of the lower slider body 51 along the length direction thereof and rolling by being inserted in the upper end rail 34 of the lower rail 30, and two lower end rail rollers 54 disposed adjacent to the two middle rail rollers 52 at a distance from each other along the length direction in the front surface of the lower slider body 51, and rotatable while facing the opposite direction, respectively with respect to the two upper end rail rollers 53, and rolling by being inserted in the lower end rail 38 of the lower rail 30.

An upper flange 511 and a lower flange 512 protruding by integrally extending in a direction perpendicular to the lower slider body 51 are respectively provided in an upper edge and a lower edge along the width direction of the lower slider body 51 in the lower slider body 51.

One end of the connection structure 70 is inserted between the upper flange 511 and the lower flange 512 and is rotatably engaged by a penetrating assembly pin 57.

Penetrating assembly holes 511a and 512a are respectively provided in the upper flange 511 and the lower flange 512, and thus a third latch is rotatably mounted thereto.

Figure 9:
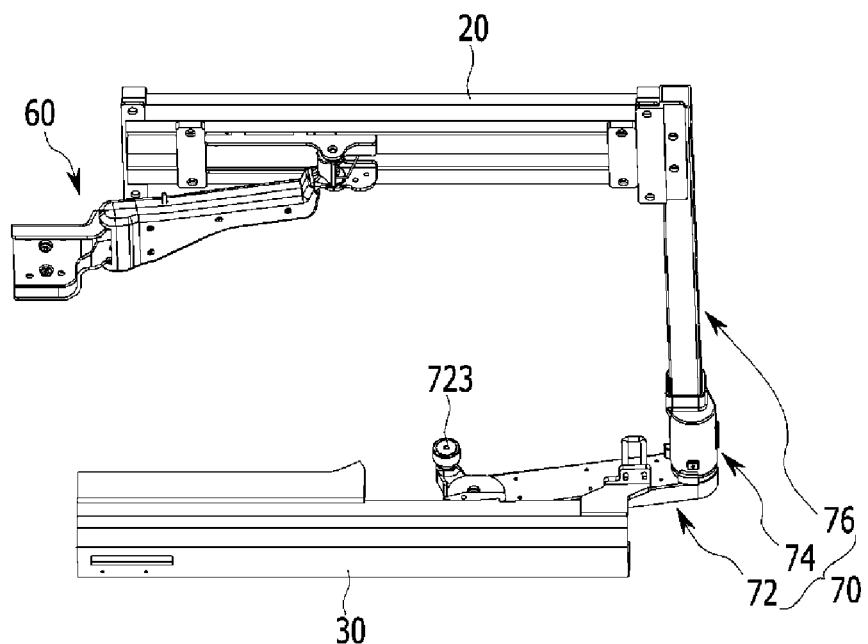
FIG. 9 is a schematic diagram illustrating main parts of the exemplary front sliding door locking device.
Figure 10:
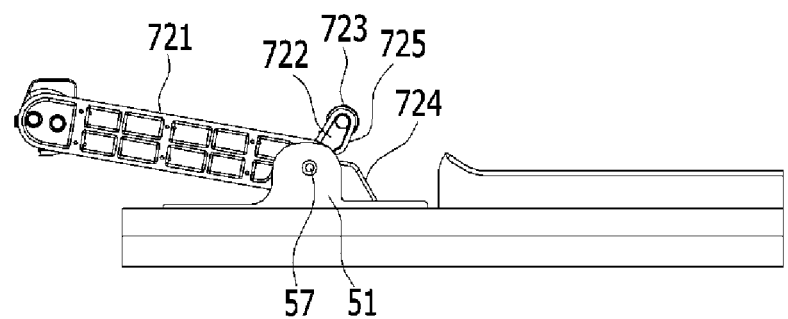
FIG. 10 shows the lower rail and a connection structure that are coupled together in the exemplary front sliding door locking device of the vehicle according to the present invention.

Referring to FIG. 9 and FIG. 10, the connection structure 70 includes a swing arm 72 of which one end is engaged to the lower slider body 51 with the assembly pin 57, a rotation joint 74 mounted to the other end of the swing arm 72, and a square-shaped support bar 76 of which one end of mounted to the rotation joint 74 and the other end is integrally fixed to the upper rail 20.

The swing arm 72 includes a swing arm body formed in the shape of a square bar 721, an operation protrusion 722 formed by integrally protruding from one end of the swing arm body 721 while forming a predetermined angle with the swing arm body 721, a second upper end rail roller 723 mounted to one end of the operation protrusion 722 and at the same time rolling by being inserted in the second upper end rail 36 when the front door is opened, and a return spring 724 being wound to an external circumference surface of the assembly pin 57 and providing an elastic restoring force to the swing arm 72.

An operation surface 725 that releases a latch 90 may be provided in the operation protrusion 722.

The second upper end rail roller 723 is inserted in the second upper end rail 36 to stop additional swinging of the swing arm 72 when the front door is opened and thus the swing arm 72 swings with an angle of about 80°.

Figure 11:
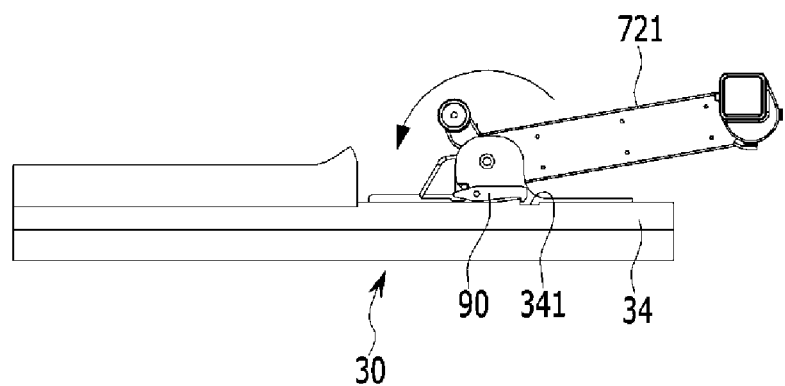
FIG. 11 shows the lower rail and a connection structure of FIG. 10, but viewed from a different angle.

Referring to FIG. 11, a concave locking groove 341 is formed in a given portion along the length direction of the first upper end rail 34 of the lower rail 30, and the latch 90 is rotatably mounted to the assembly holes 511a and 512a of the upper and lower flanges 511 and 512.

Figure 12:
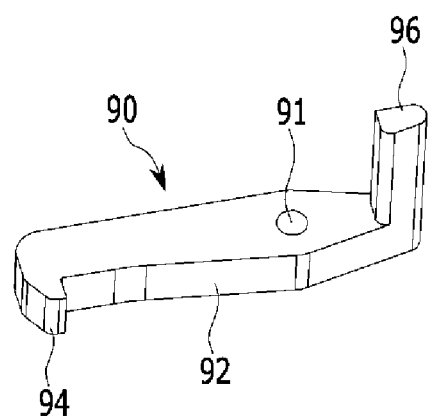
FIG. 12 is a perspective view of a latch in the exemplary front sliding door locking device of a vehicle according to the present invention.

Referring to FIG. 12, the latch 90 includes a latch body 92 where an assembly hole 91 that matches the assembly holes 511a and 512a of the upper flange 511 and the lower flange 512 is formed, a hook 94 provided at one end of the latch body 92 and detachably hooked to the locking groove 341 of the first upper rail 34, and a pressure protrusion 96 protruding perpendicularly to the latch body 92 in the opposite side portion of the hook 94 and being pressed by the operation surface 725 of the operation protrusion 722 along rotation of the swing arm 72.

The latch 90 and the operation protrusion 722 of the swing arm 72 form the sliding door locking device of the vehicle according to various embodiments of the present invention.

Figure 13:
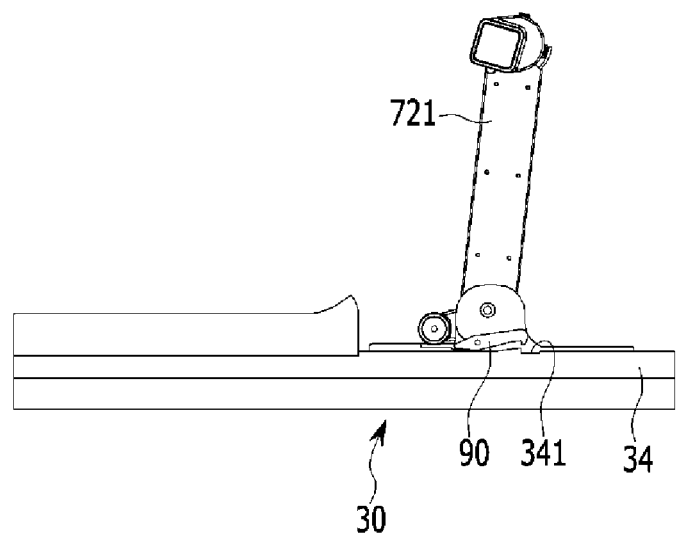
FIG. 13 is an operation state view of the latch according to the present invention.

Referring to FIG. 13, when the swing arm 72 rotates about 80° together with pivot movement of the front door, the pressure protrusion 96 of the latch 90 is pressed by the operation surface 725 of the operation protrusion 722 and thus the latch 90 rotates in the anticlockwise direction with reference to the assembly pin assembled to the assembly hole 91 as marked by the arrow in FIG. 11. Then the hook 94 is unhooked from the locking groove 341 of the first upper end rail 34 so that the lower slider 50 can move along the lower rail 30 and accordingly the front door can slidably move to a front side of the vehicle.

Figure 14:
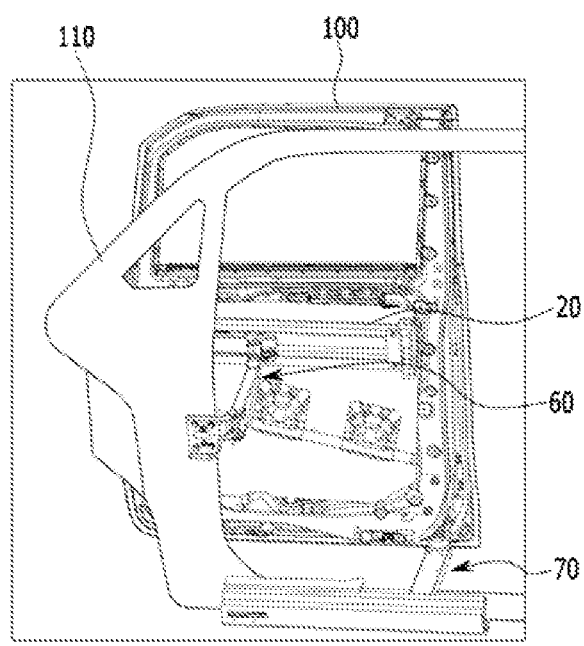
FIG. 14 is a state view illustrating after pivot movement of a sliding door of the exemplary front sliding door locking device of the vehicle according to the present invention.

That is, as shown in FIG. 14, when the front door 100 is opened while being fixed to the vehicle body 110, the front door 100 moves to an outer side along a width direction of the vehicle. Then, the swing arm 62 of the upper support structure 60 and the swing arm 72 of the lower connection structure 70 rotate about 80° due to the pivot movement of the front door 100.

When the front door 100 finishes the pivot movement, the latch 90 is released from the locking groove 341 so that the lower slider 50 and lower rail 30 can perform relative movement.

Figure 15:
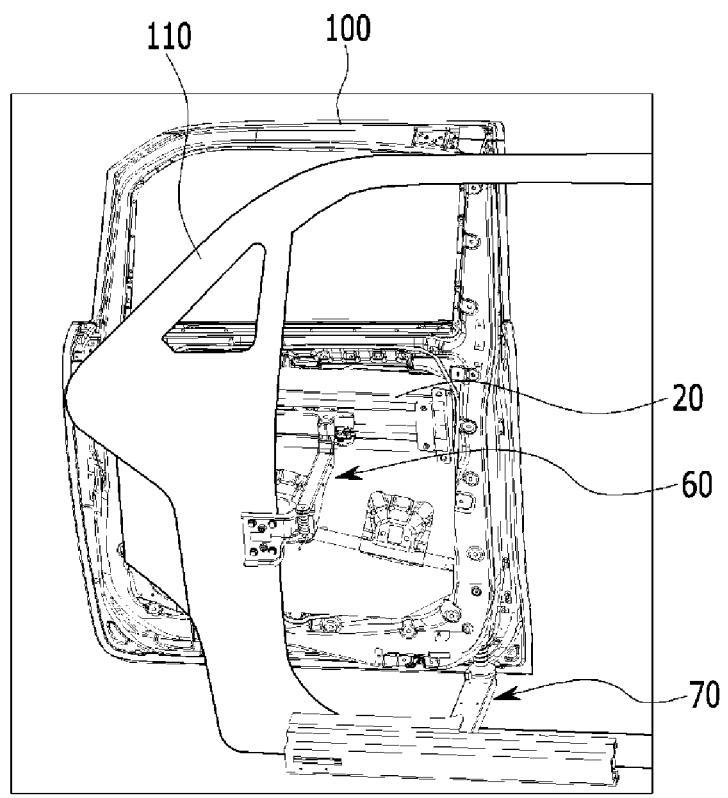
FIG. 15 is a view illustrating a state that the sliding door of the exemplary front sliding door locking device of the vehicle is slidably moved to a front side along a length direction of the vehicle.

In such a state, as shown in FIG. 15, when the front door 100 is moved to a front side along the length direction of the vehicle, the front door 100 slidably moves along the lower rail 30 while an upper portion thereof is supported by the upper slider 40 and supported by the lower rail 30 through the lower slider 50 by the connection structure 70, and the upper slider 40 supports the upper rail 20 while being inserted in the upper rail 20 and rolling along the upper rail 20.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door locking device of a vehicle, comprising:
   a main rail mounted to a vehicle body along a length direction of the vehicle body;
   a slider inserted in and slidably coupled to the main rail;
   a connection structure having a first end relatively rotatably coupled to the slider and a second end coupled to a door of the vehicle to slidably support the door of the vehicle;
   a latch rotatably mounted to the slider to selectively lock the connection structure to the main rail; and
   a concave locking groove formed in the main rail,
   wherein the latch is removable from the concave locking groove after the latch is disposed in the groove,
   wherein the main rail comprises:
      a middle rail provided at a center of the main rail in a height direction of the main rail;
      a first upper end rail provided at a position higher than the middle rail;
      a second upper end rail provided at a position higher than the first upper end rail;
      and a lower end rail provided at a position lower than the middle rail, and
   wherein the concave locking groove is formed in a portion of the first upper end rail along a length direction of the first upper end rail.

2. The sliding door locking device of claim 1, wherein the connection structure comprises a swing arm, and the latch is removed from the concave locking groove by rotation of the swing arm.

3. The sliding door locking device of claim 2, wherein the swing arm comprises:
   a swing arm body;
   an operation protrusion integrally protruding from the swing arm body and forming a predetermined angle with respect to the swing arm body;
   an upper end rail roller mounted to a front end of the operation protrusion and being inserted into and rolling in the second upper end rail when the door is moved from a closed position to a fully open position; and
   a return spring providing an elastic restoring force to the swing arm.

4. The sliding door locking device of claim 3, wherein an operation surface, for rotating the latch, is formed on the operation protrusion.

5. The sliding door locking device of claim 4, wherein the latch comprises:
   a latch body rotatably mounted to the slider;
   a hook formed at a first end of the latch body; and
   a pressure protrusion protruding from the latch body at a second end of the latch body opposite to the first end of the latch body, and the pressure protrusion being pressed by the operation surface of the operation protrusion of the swing arm by the rotation of the swing arm.

\* \* \* \* \*